United States Patent
Namihira et al.

(10) Patent No.: US 9,904,499 B2
(45) Date of Patent: Feb. 27, 2018

(54) INFORMATION PROCESSING SYSTEM FOR DYNAMICALLY ADDING A PROCESS TO A SEQUENCE OF PROCESSES AND INFORMATION PROCESSING METHOD USING SAME

(71) Applicants: Kohsuke Namihira, Tokyo (JP); Yuuichiroh Hayashi, Kanagawa (JP); Kazunori Sugimura, Kanagawa (JP); Dongzhe Zhang, Tokyo (JP)

(72) Inventors: Kohsuke Namihira, Tokyo (JP); Yuuichiroh Hayashi, Kanagawa (JP); Kazunori Sugimura, Kanagawa (JP); Dongzhe Zhang, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

(21) Appl. No.: 15/066,000

(22) Filed: Mar. 10, 2016

(65) Prior Publication Data

US 2016/0274945 A1 Sep. 22, 2016

(30) Foreign Application Priority Data

Mar. 20, 2015 (JP) .................................. 2015-058021

(51) Int. Cl.
 *G06F 9/46* (2006.01)
 *G06F 3/12* (2006.01)
(52) U.S. Cl.
 CPC .................................. *G06F 3/1275* (2013.01)
(58) Field of Classification Search
 None
 See application file for complete search history.

(56) References Cited

U.S. PATENT DOCUMENTS

| 8,867,073 | B2 | 10/2014 | Fukasawa | |
|---|---|---|---|---|
| 2014/0089037 | A1* | 3/2014 | Bhatnagar | G06F 9/542 705/7.27 |
| 2015/0067687 | A1* | 3/2015 | Turner | G06F 9/4881 718/102 |

FOREIGN PATENT DOCUMENTS

| JP | 2012-053511 | 3/2012 |
|---|---|---|
| JP | 5112085 | 1/2013 |

* cited by examiner

*Primary Examiner* — Gregory A Kessler
(74) *Attorney, Agent, or Firm* — IPUSA, PLLC

(57) ABSTRACT

An information processing system stores, for each application for carrying out a first sequence of processes using electronic data, application identification information and first-sequence information in a manner of associating them with one another; receives a request including the application identification information and electronic-data information; carries out the first sequence of processes on the electronic data according to the request; determines, before carrying out each process of the first sequence of processes, whether to generate second-sequence information where information concerning an additional process to be carried out before the process of the first sequence of processes is added, and if the determination result is to generate the second-sequence information, generates the second-sequence information and carries out a second sequence of processes where the additional process is carried out before the process of the first sequence of processes, on the electronic data.

7 Claims, 16 Drawing Sheets

FIG.5A

COMMON I/F OF FILE PROCESS PART

| COMMON I/F | FUNCTION |
|---|---|
| /EXTERNAL SERVICE NAME/process/file | ACQUIRE FILE FROM DESIGNATED STORAGE SERVICE |
| /EXTERNAL SERVICE NAME/process/folder | STORE FILE IN DESIGNATED STORAGE SERVICE |
| ... | ... |

FIG.5B

UNIQUE I/F OF FILE PROCESS PART

| UNIQUE I/F | FUNCTION |
|---|---|
| /EXTERNAL SERVICE NAME/process/extension/attach | ATTACH FILE TO DOCUMENT STORED IN DESIGNATED STORAGE SERVICE |
| ... | ... |

FIG.5C

COMMON I/F OF DATA PROCESS PART

| COMMON I/F | FUNCTION |
|---|---|
| /EXTERNAL SERVICE NAME/data/files | ACQUIRE FILE LIST FROM DESIGNATED STORAGE SERVICE |
| /EXTERNAL SERVICE NAME/data/folders | ACQUIRE FOLDER LIST FROM DESIGNATED STORAGE SERVICE |
| ... | ... |

FIG.5D

UNIQUE I/F OF DATA PROCESS PART

| UNIQUE I/F | FUNCTION |
|---|---|
| /EXTERNAL SERVICE NAME/data/extension/images | ACQUIRE IMAGE FILE LIST FROM DESIGNATED STORAGE SERVICE |
| ... | ... |

FIG.6

```
{
    "flowId":"flow1",
    "flowDetails":[
        {
            "operation":"ocr",
            "parameters":{
                "language":"English",
                "outputType":"pdf"
            }
        },
        {
            "operation":"uploadFile",
            "parameters":{
                "folderId":""
            }
        }
    ]
}
```

1100

1101 — ocr operation block

1102 — uploadFile operation block

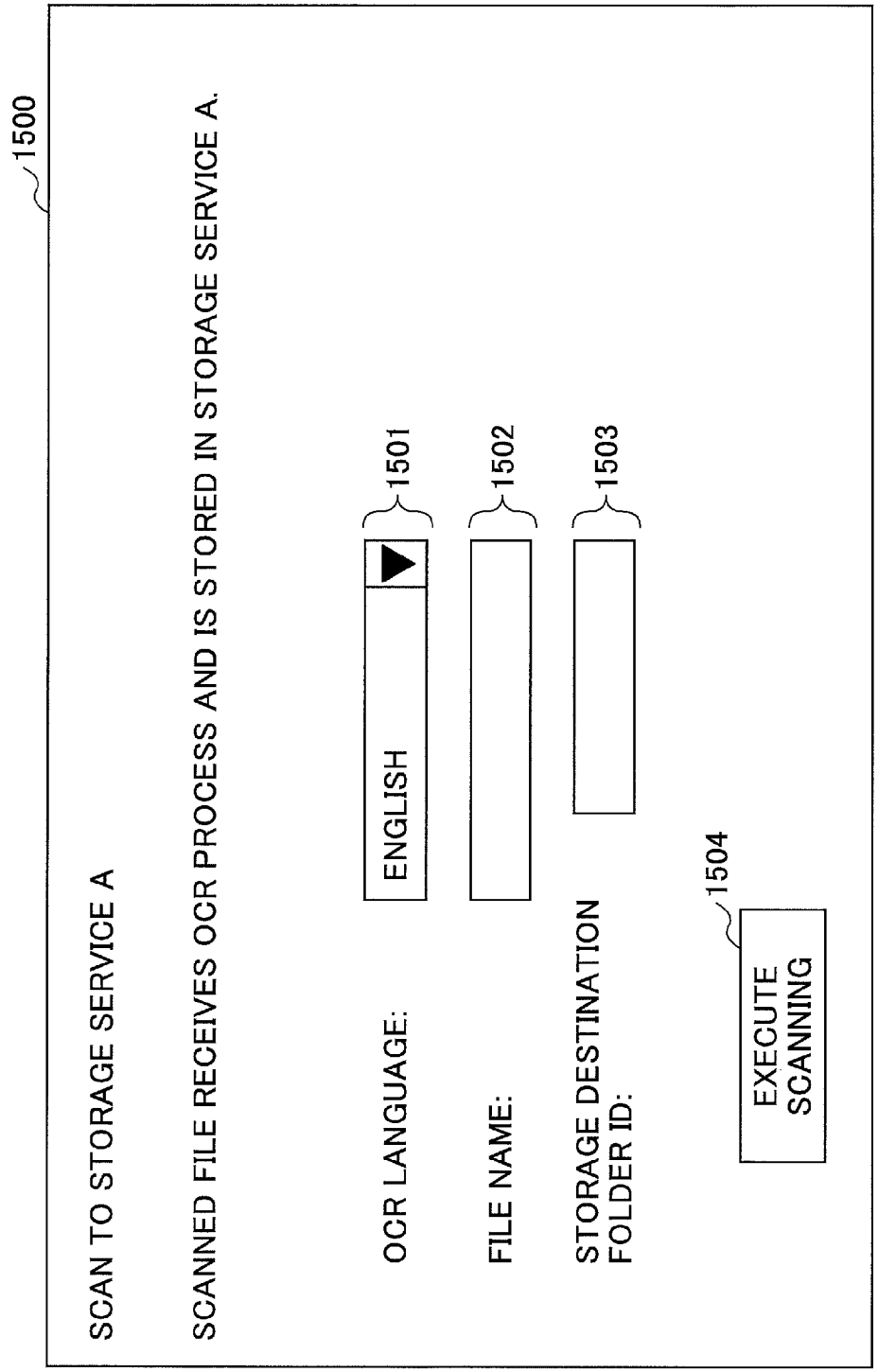

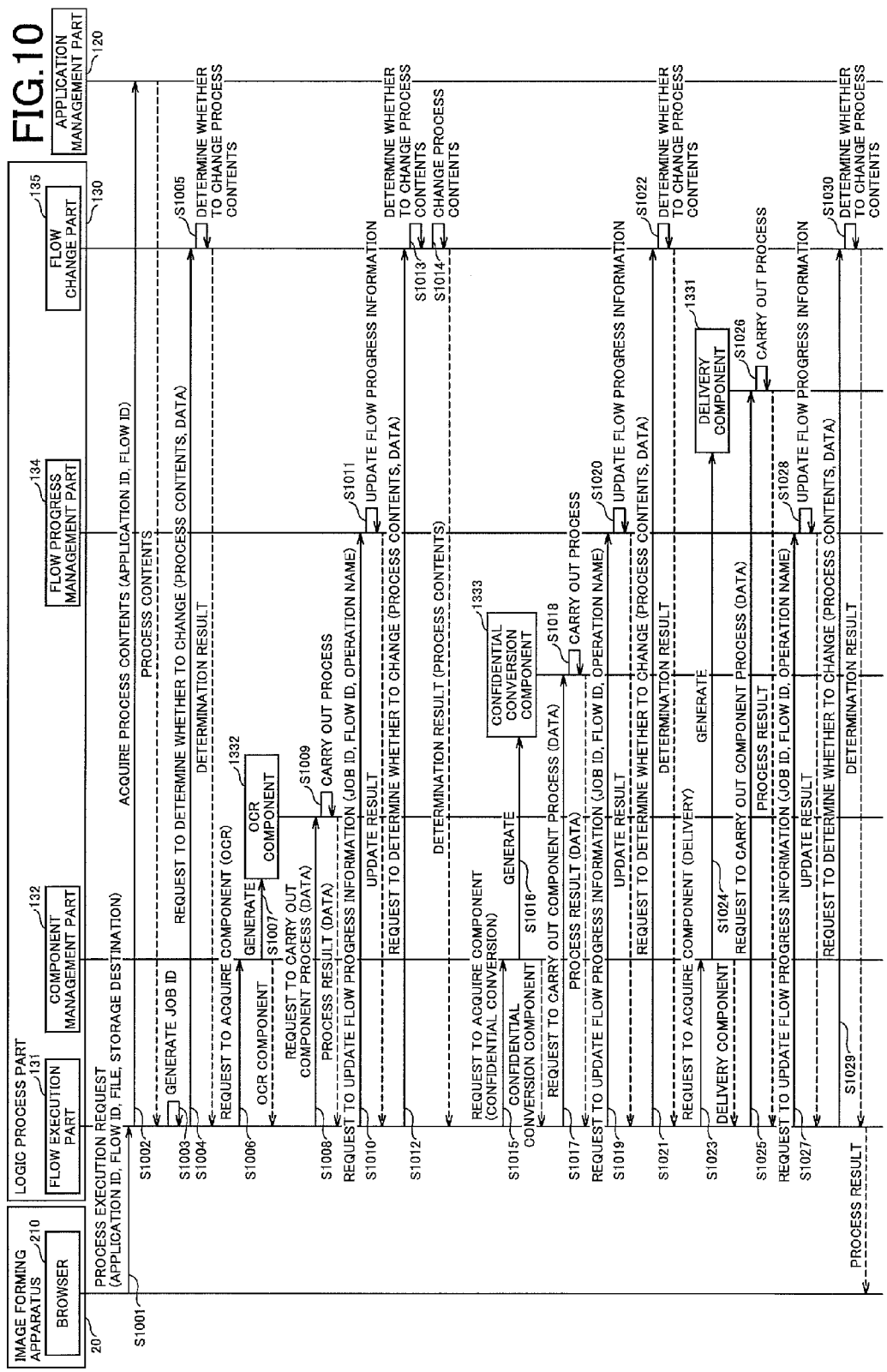

| CHANGE RULE ID | CHANGE CONDITION | CHANGE CONTENTS |
|---|---|---|
| 1 | TEXT "PASSWORD" OR "CONFIDENTIAL" IS INCLUDED IN PDF FILE | ADD OPERATION "pdf2securepdf" TO CONVERT TO PDF FILE WITH PASSWORD |
| 2 | PROCESS EXECUTION REQUEST IS RECEIVED FROM IMAGE FORMING APPARATUS $20_2$ | ADD OPERATION "bgpattern" TO CARRY OUT BACKGROUND PATTERN ADDITION PROCESS |
| 3 | FILE SIZE IS GREATER THAN OR EQUAL TO THRESHOLD | ADD OPERATION "zip" TO CARRY OUT FILE COMPRESSION PROCESS |
| 4 | FILE DELIVERY TO STORAGE SERVICE IS FAILED | ADD OPERATION "mailFile" TO TRANSMIT EMAIL TO DESIGNATED EMAIL ADDRESS |
| . . . . | | |

FIG.12A

| JOB ID | APPLICATION ID | FLOW ID | OPERATION | 1361 |
|---|---|---|---|---|
| Job001 | app001 | flow1 | ocr | |
| Job002 | ... | ... | ... | |

FIG.12B

| JOB ID | APPLICATION ID | FLOW ID | OPERATION | 1361 |
|---|---|---|---|---|
| Job001 | app001 | flow1 | ocr | |
| | | | pdf2securepdf | |
| Job002 | ... | ... | ... | |

FIG.12C

| JOB ID | APPLICATION ID | FLOW ID | OPERATION | 1361 |
|---|---|---|---|---|
| Job001 | app001 | flow1 | ocr | |
| | | | pdf2securepdf | |
| | | | uploadFile | |
| Job002 | ... | ... | ... | |

FIG.13

```
{
    "flowId":"flow1",
    "flowDetails":[
        {
            "operation":"ocr",
            "parameters":{
                "language":"English",
                "outputType":"pdf"
            },
        },
        {
            "operation":"pdf2securePdf",
            "parameters":{
                "outputType":"securePdf"
            }
        },
        {
            "operation":"uploadFile",
            "parameters":{
                "folderId":""
            }
        }
    ]
}
```

INFORMATION PROCESSING SYSTEM FOR DYNAMICALLY ADDING A PROCESS TO A SEQUENCE OF PROCESSES AND INFORMATION PROCESSING METHOD USING SAME

CROSS-REFERENCE TO APPLICATIONS

The present patent application is based on and claims the benefit of priority of Japanese Priority Application No. 2015-058021, filed on Mar. 20, 2015, the entire contents of which are hereby incorporated herein by reference.

BACKGROUND

1. Technical Field

The present disclosure relates to an information processing system, an information processing apparatus, and an information processing method.

2. Description of the Art

Recently, various external services have become available through so-called cloud computing technology, for example. In this regard, technology is known where such an external service and an apparatus, in cooperation with each other, carry out a process. For example, technology is known where an original copy is scanned by an image forming apparatus, and the thus acquired image data is stored in an external storage service.

Technology is known where a business flow is generated for controlling components that carry out various processes, based on a previously defined business flow model (for example, see Japanese Patent No. 5112085). In such technology, components are combined according to a generated business flow, and a sequence of processes is carried out to implement the business flow.

SUMMARY

According to one aspect, an information processing system includes at least one information processing apparatus. The information processing system includes at least one processor, which is configured to store, for each application that carries out a first sequence of processes using electronic data, application identification information to identify the application and first-sequence information concerning the first sequence of processes, in a manner of associating them with one another; receive, from one apparatus connected with the information processing system, a request that includes the application identification information and electronic-data information concerning the electronic data designated by a user of the one apparatus; carry out the first sequence of processes based on the first-sequence information stored in association with the application identification information included in the request on the electronic data designated by the electronic-data information included in the request; determine, before carrying out each process of the first sequence of processes, whether to generate second-sequence information that is different from the first-sequence information in that previously-carried-out-process information concerning an additional process to be carried out before the process of the first sequence of processes is added, and if the at least one processor determines to generate the second-sequence information, generate the second-sequence information; and if the at least one processor generates the second-sequence information, carry out a second sequence of processes that is different from the first sequence of processes in that the additional process is carried out before the process of the first sequence of processes, on the electronic data.

Other objects, features, and advantages will become more apparent from the following detailed description when read in conjunction with the accompanying drawings.

BRIEF DESCRIPTION OF THE DRAWINGS

FIGS. 5A-5D illustrate examples of common I/Fs and unique I/Fs;

FIG. 6 illustrates one example of process contents;

FIG. 9 illustrates one example of an application screen page for using the scan delivery service;

FIG. 10 is a sequence diagram illustrating one example of a delivery process according to the first embodiment;

FIG. 11 illustrates one example of a change rule information table;

FIGS. 12A-12C illustrates examples of flow progress information tables;

FIG. 13 illustrates one example of changed process contents;

DETAILED DESCRIPTION OF EMBODIMENTS

According to the above-described technology, a business flow is generated based on a previously defined business flow model. Therefore, it is not possible to dynamically add a process to a sequence of processes that implement a business flow. Therefore, if it becomes necessary to additionally carry out a certain process during a sequence of processes, the sequence of processes is to be carried out again after adding the certain process.

Embodiments have been devised in consideration of such a situation, and an object of the embodiments is to make it possible to dynamically add a process to a sequence of processes.

Below, the embodiments will be described with reference to the drawings.

[First Embodiment]

<System Configuration>

Figure 1:
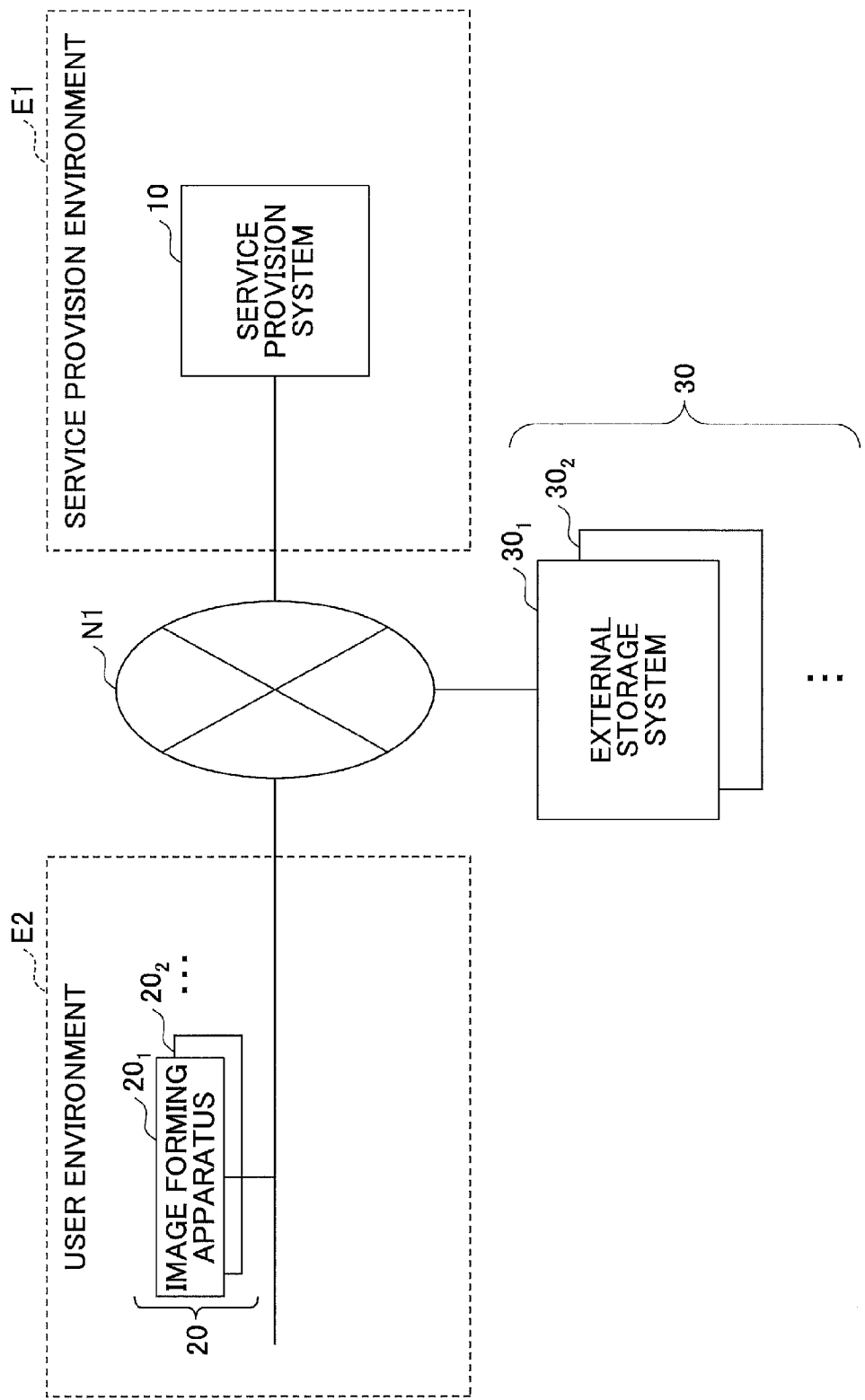
FIG. 1 is a system configuration diagram illustrating one example of an information processing system according to a first embodiment.

First, a system configuration of an information processing system 1 according to a first embodiment will be described with reference to FIG. 1. FIG. 1 is a system configuration diagram illustrating one example of the information processing system according to the first embodiment. The information processing system 1 shown in FIG. 1 includes a service provision environment E1, a user environment E2, and an external storage system 30, and they are connected via a wide area network N1 such as the Internet in a manner that they can carry out communications thereamong.

The service provision environment E1 is a system environment that provides external services such as cloud services via the network. Concerning the first embodiment, a description will be made for a case where cloud services are used as specific examples of external services. Alternatively, the first embodiment can be implemented for services provided by a network such as services provided by an Application Service Provider (ASP), services provided by a Web server, and so forth.

The service provision environment E1 includes a service provision system 10 that includes at least one information processing apparatus. The service provision system 10 cooperates with external services via the network, and provides various services. For example, the service provision system 10 provides a service (i.e., a scan delivery service) that includes scanning an original copy using an image forming apparatus 20 in the user environment E2, carrying out an Optical Character Reader (OCR) process on the thus generated electronic file, and storing the thus processed file in the external storage system 30. Concerning the first embodiment, the description will be made assuming that the service provision system 10 provides such a scan delivery service.

However, services provided by the service provision system 10 are not limited thereto. The service provision system 10 can also provide, for example, a service (i.e., a cloud printing service) that includes printing an electronic file stored in the external storage system 30 using the image forming apparatus 20 in the user environment E2. Also, the service provision system 10 can provide, for example, a service that includes, after carrying out an OCR process on an electronic file acquired through scanning an original copy using the image forming apparatus 20, translating the thus acquired file to a file of a predetermined language (for example, translation from English to Japanese), and storing the thus processed file in the external storage system 30. Also, the service provision system 10 can provide a service that includes, for example, projecting an electronic file stored in the external storage system 30 using a projector included in the user environment E2.

All or a part of the service provision system 10 can be installed in the user environment E2. That is, all or some of information processing apparatuses included in the service provision system 10 can be included in the user environment E2.

The user environment E2 is, for example, a system environment in a company or the like that is a user who uses the image forming apparatuses 20. The user environment E2 is such that the one or more image forming apparatuses 20 are connected together via a network, for example, Local Area Network (LAN) or the like.

The image forming apparatuses 20 according to the first embodiment have scanning functions. However, the image forming apparatuses 20 can be multifunction peripherals (MFPs), or the like, having, in addition to the scanning functions, printing functions, copying functions, facsimile (FAX) functions, and/or the like.

The external storage systems 30 are computer systems that provide cloud services called storage services (or online storages) via the network. The storage services are services to lend storage areas of the external storage systems 30. According to the first embodiment, in a scan delivery service, an electronic file is stored in (or uploaded to) a storage area that is lent by the external storage system 30.

Hereinafter, the plurality of external storage systems 30 may be expressed using suffixes as "external storage system $30_1$", "external storage system $30_2$", and so forth, for distinguishing the respective external storage systems. A service provided by the external storage system $30_1$ will be referred to as a "storage service A", a service provided by the external storage system $30_2$ will be referred to as a "storage service B", and so forth.

Each of the external storage systems 30 can include a plurality of information processing apparatuses. The configuration of the information processing system 1 shown in FIG. 1 is one example, and the information processing system 1 can have another configuration. For example, the user environment E2 can include, in addition to or instead of the image forming apparatuses 20, various apparatuses/devices such as projectors, electronic blackboards, cell phones, smart phones, and/or the like.

<Hardware Configuration>

Hardware configurations of the service provision system 10 and each image forming apparatus 20 according to the first embodiment will now be described using FIGS. 2 and 3, respectively.

<<Service Provision System>>

Figure 2:
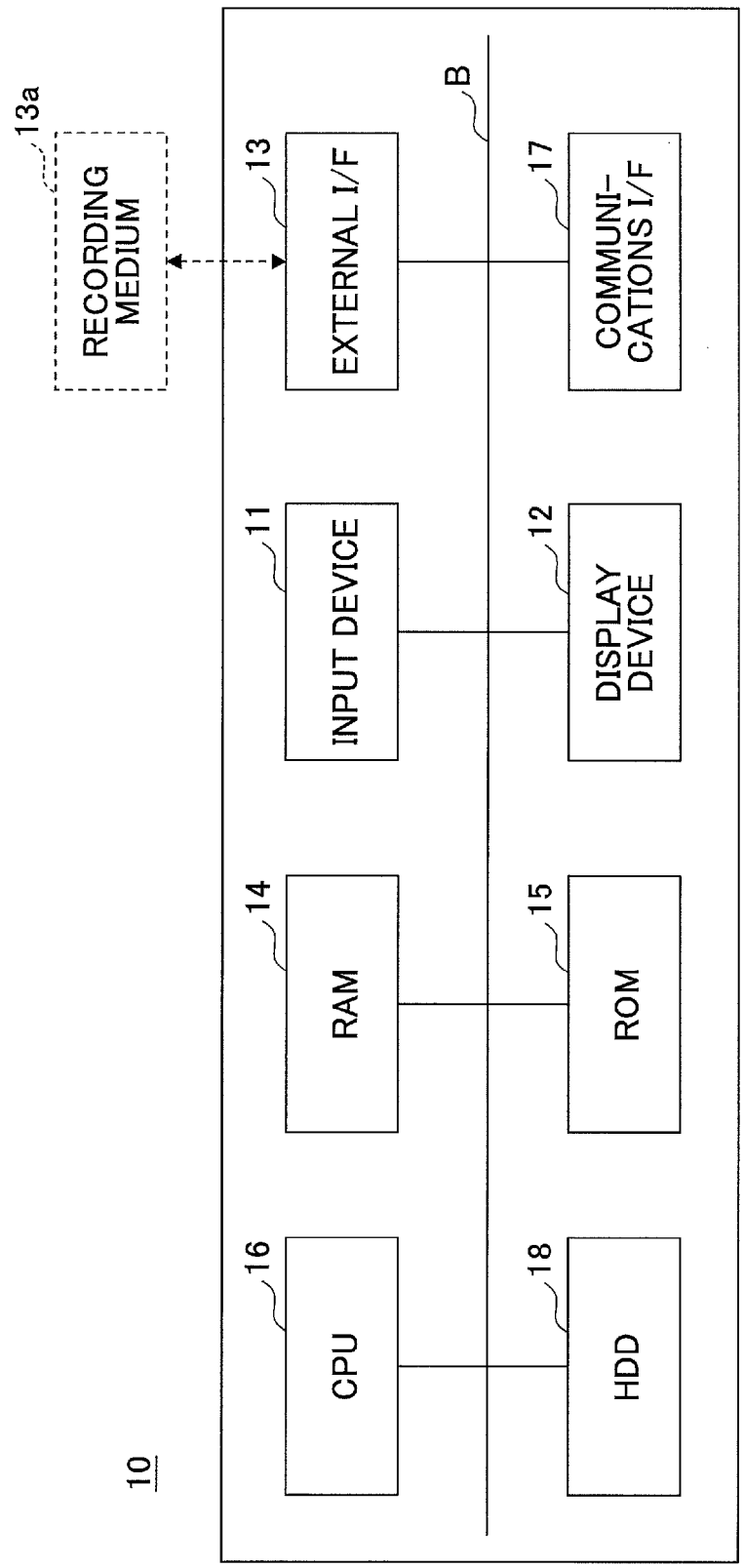
FIG. 2 is a hardware configuration diagram illustrating one example of a service provision system according to the first embodiment.

The service provision system 10 shown in FIG. 1 has a hardware configuration, for example, as shown in FIG. 2. FIG. 2 is a hardware configuration diagram illustrating one example of the service provision system according to the first embodiment. The service provision system 10 shown in FIG. 2 includes an input device 11, a display device 12, an external I/F 13, and a Random Access Memory (RAM) 14. Also, the service provision system 10 includes a Read-Only Memory (ROM) 15, a Central Processing Unit (CPU) 16, a communications I/F 17, and a Hard Disk Drive (HDD) 18. These hardware elements are connected via a bus B.

The input device 11 includes a keyboard, a mouse, a touch panel, and/or the like, and is used for a user to input various operation signals. The display device 12 includes a display unit, or the like, and displays a process result from the service provision system 10. Alternatively, the input device 11 and the display device 12 can be connected to the service provision system 10 only in a case where they are used.

The communications I/F 17 is an interface for connecting the service provision system 10 to the network N1. Thus, the service provision system 10 carries out data communications via the communications I/F 17.

The HDD 18 is one example of a nonvolatile storage device that stores programs and data. The stored programs include an Operating System (OS) that is basic software to control the entirety of the service provision system 10, and application software that provides various functions under the control of the OS. The service provision system 10 can use, instead of the HDD 18, a drive (for example, a solid state drive (SSD)) that uses a flash memory as a recording medium. The HDD 18 manages the stored programs and data using a predetermined file system(s), and/or database.

The external I/F 13 is an interface for an external apparatus. The external apparatus can be a recording medium 13a, or the like. Thus, the service provision system 10 reads information from and writes information to the recording medium 13a via the external I/F 13. Specific examples of the recording medium 13a include a flexible disk, a CD, a DVD, a SD memory card, a USB memory, and so forth.

The ROM 15 is a nonvolatile semiconductor memory (storage device) that holds programs and data even after the power supply thereto is turned off. The ROM 15 stores programs and data such as a Basic Input/Output System (BIOS) that is carried out when the service provision system 10 is started, OS settings, network settings, and so forth. The RAM 14 is a volatile semiconductor memory (storage device) that temporarily stores programs and data.

The CPU 16 is a processing unit that reads programs and data from the storage device such as the ROM 15 or the HDD 18 to the RAM 14, and carries out processes. Thus, the CPU 16 controls the entirety of the service provision system 10 and implements the functions thereof.

The service provision system 10 according to the first embodiment has the above-described hardware configuration, and thus, carries out various processes that will be described later.

<<Image Forming Apparatus>>

Figure 3:
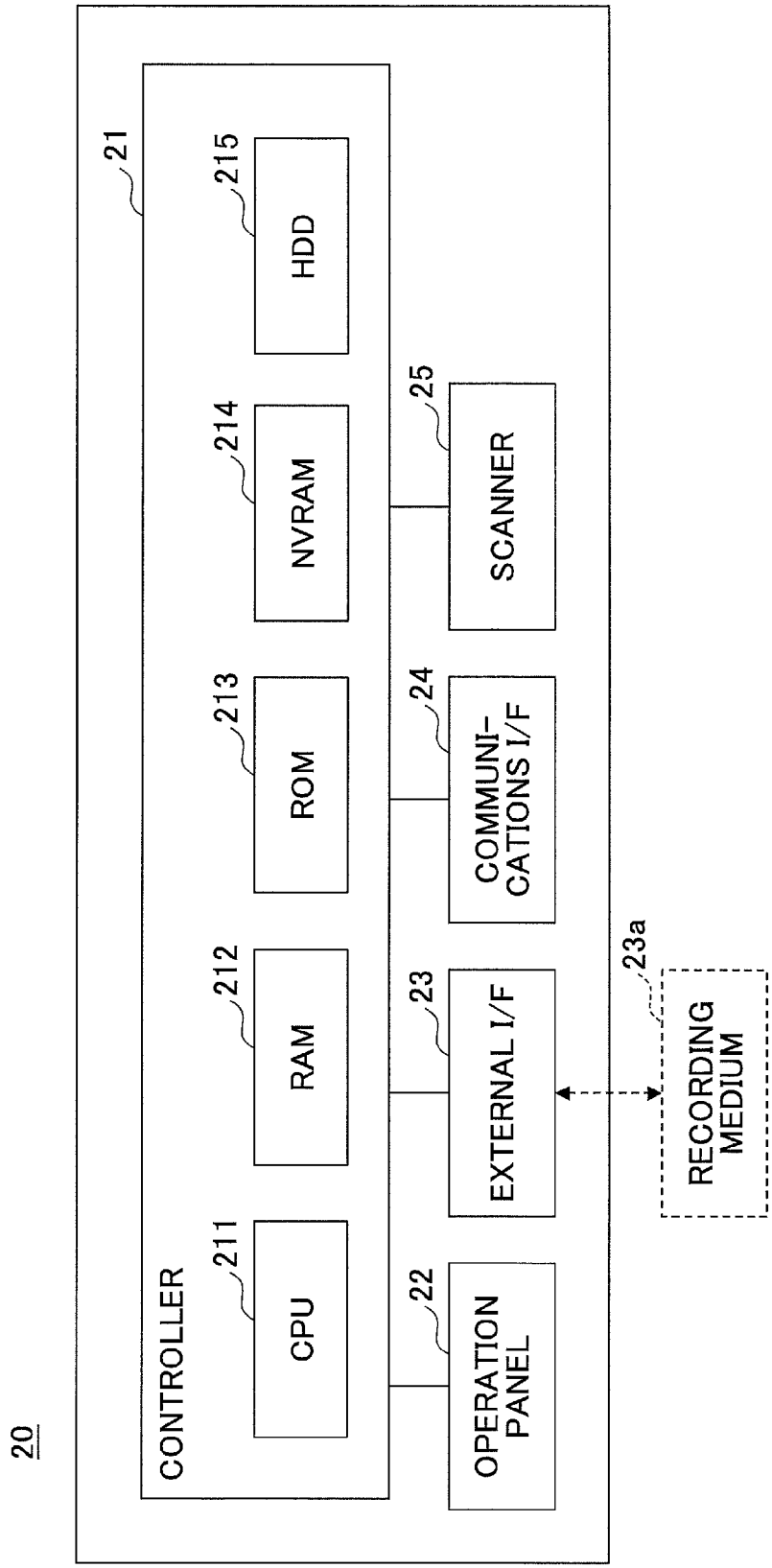
FIG. 3 is a hardware configuration diagram illustrating one example of an image forming apparatus according to the first embodiment.

Each of the image forming apparatuses 20 shown in FIG. 1 has a hardware configuration, for example, as shown in FIG. 3. FIG. 3 is a hardware configuration diagram illustrating one example of the image forming apparatus according to the first embodiment. The image forming apparatus 20 shown in FIG. 3 includes a controller 21, an operation panel 22, an external I/F 23, a communications I/F 24, and a scanner 25. The controller 21 further includes a CPU 211, a RAM 212, a ROM 213, a NVRAM 214, and a HDD 215. The ROM 213 stores various programs and data. The RAM 212 temporarily stores programs and data. The NVRAM 214 stores, for example, setting information, and so forth. The HDD 215 stores various programs and data.

The CPU 211 reads programs, data, setting information, and so forth, from the ROM 213, the NVRAM 214, the HDD 215, or the like, to the RAM 212, and carries out processes. Thus, the CPU 211 controls the entirety of the image forming apparatus 20 and implements functions thereof.

The operation panel 22 includes an input part that receives a user's input, and a display part that carries out a display. The external I/F 23 is an interface for an external apparatus. The external apparatus can be a recording medium 23a, for example. Thus, the image forming apparatus 20 reads information from and writes information to the recording medium 23a via the external I/F 23. Specific examples of the recording medium 23a include an IC card, a flexible disk, a CD, a DVD, a SD memory card, a USB memory, and so forth.

The communications I/F 24 is an interface for connecting the image forming apparatus 20 to the network N1. Thus, the image forming apparatus 20 carries out data communications via the communications I/F 24. The scanner 25 is a reading device that reads an original copy to generate an image file (an electronic file).

Each image forming apparatus 20 according to the first embodiment has the above-described hardware configuration, and thus, carries out various processes that will be described later.

<Software Configuration>

Figure 4:
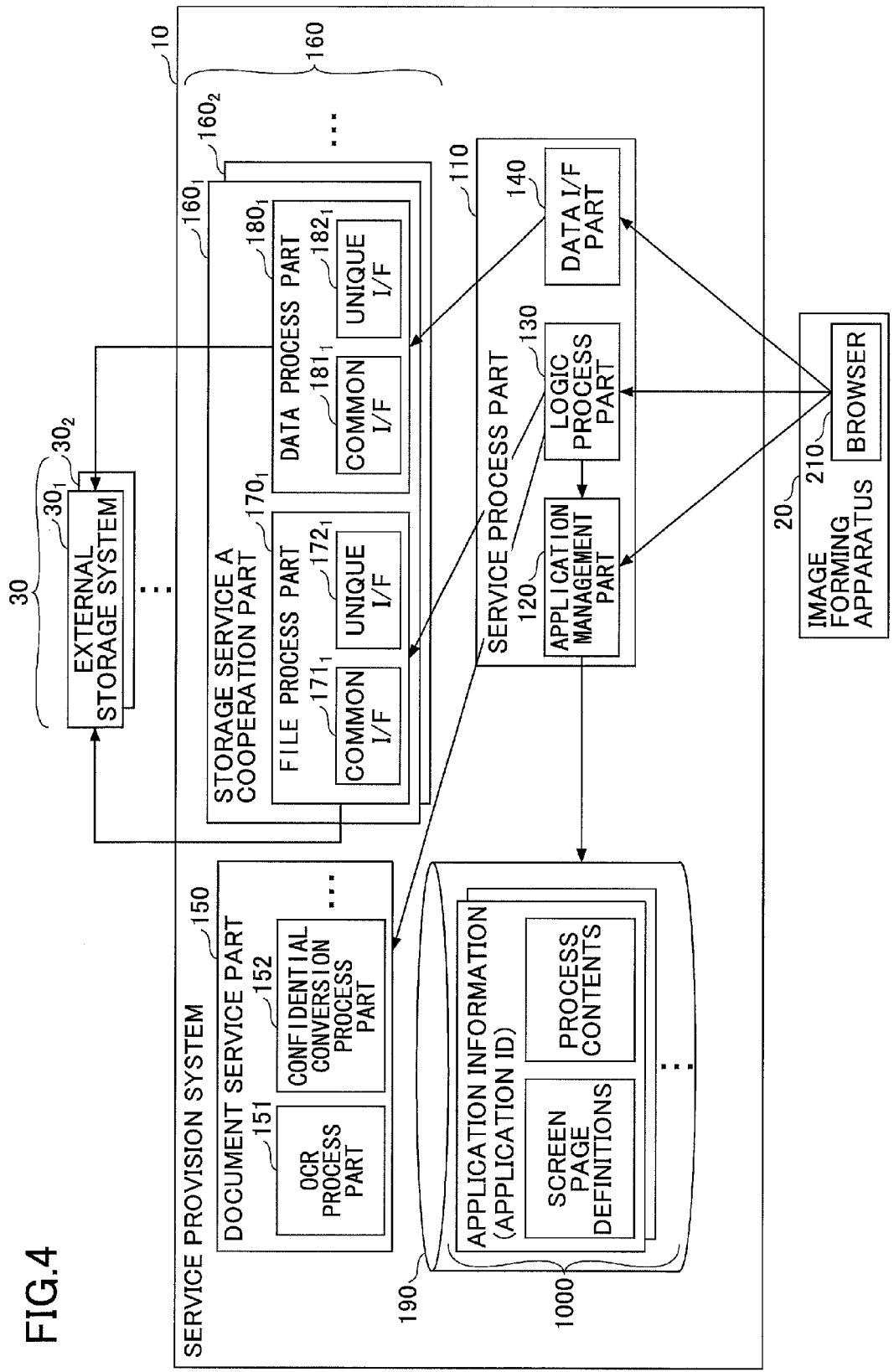
FIG. 4 is a process block diagram illustrating one example of the information processing system according to the first embodiment.

Process blocks of the information processing system 1 according to the first embodiment will now be described with reference to FIG. 4. FIG. 4 is a process block diagram illustrating one example of the information processing system according to the first embodiment. The image forming apparatus 20 has a browser 210 that is implemented by, for example, the CPU 211. A user of the image forming apparatus 20 can use a service provided by the service provision system 10 via the browser 210. Because the image forming apparatus 20 of the first embodiment has the browser 210 installed therein, it is not necessary to develop a special application for using a service.

The service provision system 10 includes a service process part 110, a document service part 150, and a storage service cooperation part 160. These parts are implemented as a result of one or more programs installed in or downloaded to the service provision system 10 being executed by the CPU 16, or the like.

The service provision system 10 further includes an application information storage part 190. The application information storage part 190 is implemented by the HDD 18. Alternatively, the application information storage part 190 can be implemented by a storage device, or the like, connected with the service provision system 10 via a network.

The service process part 110 includes an application management part 120, a logic process part 130, and a data I/F part 140.

The application management part 120 manages application information 1000 that is stored in an application information storage part 190. In response to a request from the browser 210, the application management part 120 returns an application screen page based on a screen page definition included in the application information 1000. Thus, an application screen page for using a service provided by the service provision system 10 is displayed by the browser 210 of the image forming apparatus 20. The application information 1000 is information including screen page definitions for displaying application screen pages on the image forming apparatus 20, and process contents of services implemented by the application information 1000.

In response to a request from the logic process part 130, the application management part 120 returns process contents included in the application information 1000. Although details of process contents will be described later, process contents includes a sequence of processes for implementing a service such as a scan delivery service provided by the service provision system 10.

In response to a request from the browser 210, the logic process part 130 acquires process contents from the application management part 120. Then, the logic process part 130 requests the document service part 150 or a file process part 170 of a storage service cooperation part 160 to carry out a process based on the acquired process contents. As a result, various services from the service provision system 10 are provided to the image forming apparatus 20. Detailed process blocks of the logic process part 130 will be described later.

In response to a request from the browser 210, the data I/F part 140 sends a predetermined request (for example, a request to acquire a folder list) to a data process part 180 of the storage service cooperation part 160.

The document service part 150 includes a group of programs (modules) for implementing services to be provided from the service provision system 10. The document service part 150 includes, for example, an OCR process part 151 for carrying out an OCR process on an electronic file, a confidential conversion process part 152 for converting an electronic file to an electronic file with a password, and so forth. The document service part 150 can include, for example, a program for converting an electronic file to print data that can be printed by the image forming apparatus 20, a program for compressing or decompressing an electronic file, a program for carrying out a language translation process, and so forth.

In response to requests from the logic process part 130 and the data I/F part 140, the storage service cooperation part 160 requests the external storage system 30 to carry out various processes. The service provision system 10 has the storage service cooperation part 160 for each external storage system 30. That is, the service provision system 10 has a storage service A cooperation part $160_1$ for requesting an external storage system $30_1$ to carry out a process, a storage service B cooperation part 160₂ for requesting an external storage system 30₂ to carry out a process, and so forth. Thus, for each external storage system 30, the service provision system 10 has a corresponding storage service cooperation part 160, in cooperation with which the service provision system 10 carries out a process. Hereinafter, when the respective storage service cooperation parts 160 are distinguished thereamong, subscripts are given, as "storage service A cooperation part 160₁", "storage service B cooperation part 160₂", and so forth, as shown above.

Each storage service cooperation part 160 includes, as described above, the file process part 170 that receives a request from the logic process part 130, and a data process part 180 that receives a request from the data I/F part 140.

The file process part 170 has a common I/F 171 and a unique I/F 172 where Application Programming Interfaces (APIs) for carrying out operations (for example, acquisition, storing, editing, and so forth) on electronic files stored in the external storage system 30 are defined. The common I/F 171 includes APIs usable among a plurality of external storage systems 30 in a sharing manner. Specific examples are, for example, APIs shown in FIG. 5A. In other words, the common I/F 171 of the file process part 170 is a group of APIs for using functions concerning file operations (for example, an operation to acquire a file, an operation to store a file, and so forth) that can be used concerning all the external storage systems 30. The unique I/F 172 includes APIs usable concerning specific external storage systems 30. Specific examples are, for example, APIs shown in FIG. 5B. In other words, the unique I/F 172 of the file process part 170 includes a group of APIs for using functions concerning file operations (for example, an operation to edit a file, and so forth) that can be used concerning specific external storage systems 30. Therefore, the common I/F 171 is defined for all the storage service cooperation parts 160 in the same way, whereas the unique I/F 171 is defined for specific storage service cooperation parts 160 that can use the APIs defined in the unique I/F 171.

The data process part 180 has a common I/F 181 and a unique I/F 182 where APIs for acquiring metadata such as bibliographic information (for example, a file list, a folder list, and/or the like) of electronic files stored in the external storage system 30 are defined. The common I/F 181 includes APIs that can be use among the plurality of external storage systems 30 in a sharing manner. Specific examples are, for example, APIs shown in FIG. 5O. In other words, the common I/F 181 of the data process part 180 includes a group of APIs for using functions such as a function to acquire metadata that can be used concerning all the external storage systems 30. The unique I/F 182 includes APIs that can be used concerning specific external storage systems 30. Specific examples are, for example, APIs shown in FIG. 5D. In other words, the unique I/F 182 of the data process part 180 includes a group of APIs for using functions such as a function to acquire metadata that can be used concerning specific external storage systems 30 (for example, a function to acquire an image file list, or the like). Therefore, the common I/F 181 is defined for all the storage service cooperation parts 160 in the same way, whereas the unique I/F 181 is defined for the storage service cooperation parts 160 for which APIs defined in the unique I/F 181 can be used. A Software Development Kit (SDK) can be used to, for example, add storage service cooperation part 160.

The APIs defined in the common I/F 171 and the unique I/F 172 as shown in FIGS. 5A and 5B can be used by designating "external service names (storage service names)" (i.e., a "storage service name" is defined as a variable part).

The application information storage part 190 stores the application information 1000. The application information 1000 includes screen page definitions for displaying application screen pages on the image forming apparatus 20, and process contents that indicate sequences of processes for implementing services provided by the service provision system 10. The application information 1000 is stored in the application information storage part 190 for each application ID that is used to uniquely identify a corresponding set of the application information 1000. According to the first embodiment, a set of application information for implementing a scan delivery service in corporation with a storage service A is referred to as "application information 1000₁", and the application ID of the application information 1000₁ is "app001".

FIG. 6 shows process contents included in the application information 1000₁. FIG. 6 illustrates one example of the process contents. The process contents 1100 shown in FIG. 6 include a sequence of processes that, after an OCR process is carried out on an electronic file generated through scanning, the thus acquired file is delivered to a designated folder in the storage service A. As a "flow ID" in the process contents 1100 shown in FIG. 6, a flow ID "flow1" for uniquely identifying the process contents in the application information 1000₁ is defined. As "flowDetails" in the process contents 1100 shown in FIG. 6, operations 1101 and 1102 included in the process contents are defined. "Operations" mean respective processes included in the process contents where the sequence of processes is defined for implementing the process provided by the service provision system 10. That is, in each set of the process contents, one or more operations are defined.

The process contents 1100 shown in FIG. 6 include the operation 1101 to carry out an OCR process and the operation 1102 to carry out a process of delivering (uploading) to the storage service A. In more detail, the operation 1101 is to carry out an OCR process in English and output the process result in a PDF format. The operation 1102 is to deliver (upload) an electronic file to the folder that has the designated folder ID in the storage service A.

The set of process contents 1100 shown in FIG. 6 is one example of those for implementing a scan delivery service. Alternatively, a scan delivery service can be implemented by, for example, a sequence of processes, acquired from further combining various processes, implemented by a program(s), included in the document service part 150. For example, a scan delivery service can include processes of "carrying out an OCR process on a scanned electronic file, and then, translating the thus acquired electronic file from English to Japanese, and delivering the thus acquired electronic file to a designated folder in the storage service A".

The application information 1000₁ can include a plurality of sets of process contents. That is, each set of the application information 1000 can include a plurality of sets of process contents that have different flow IDs.

Figure 7:
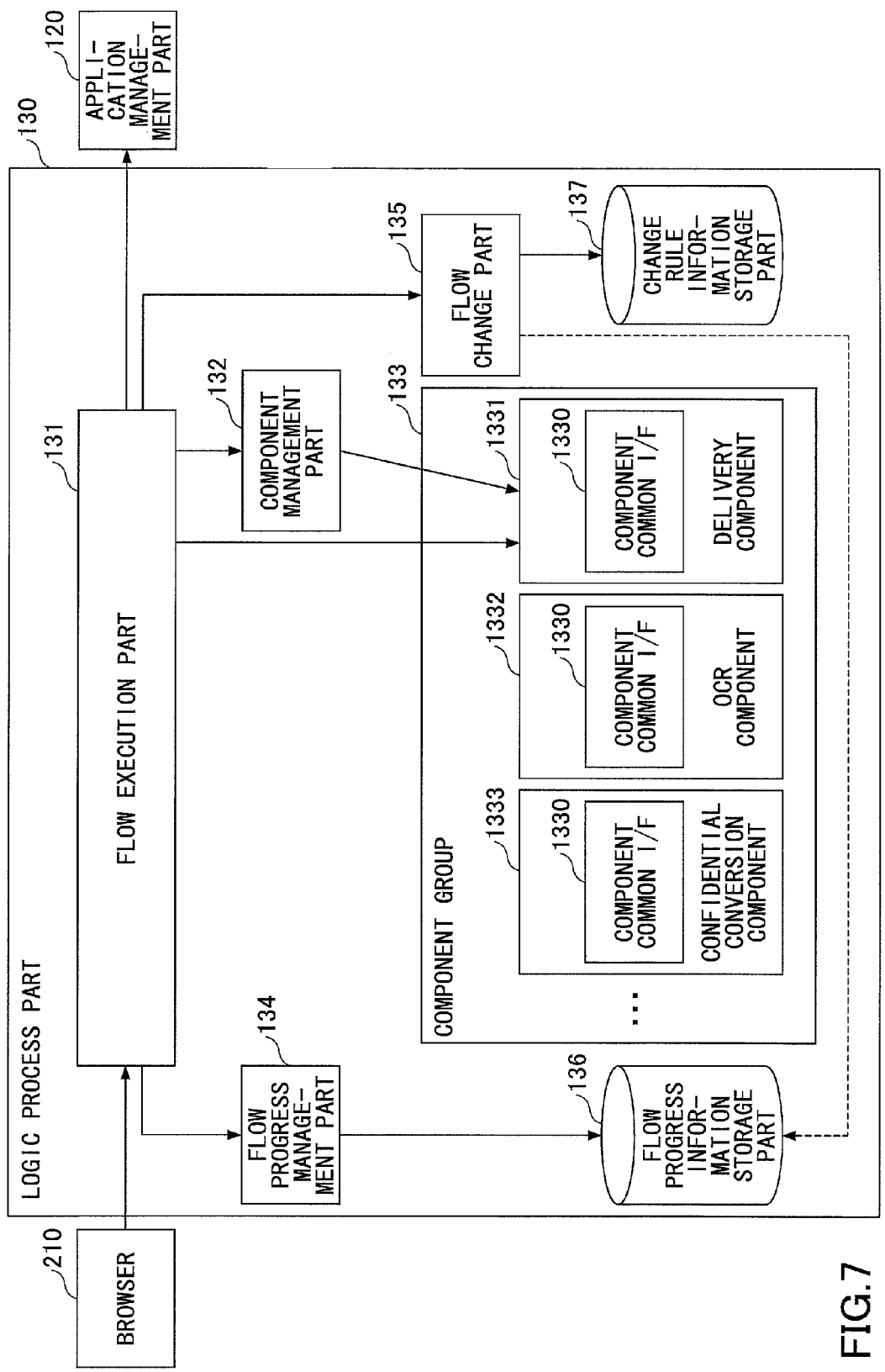
FIG. 7 is a process block diagram illustrating one example of a logic process part according to the first embodiment.

With reference FIG. 7, detailed process blocks of the logic process part 130 according to the first embodiment will now be described. FIG. 7 is a block diagram illustrating one example of the logic process part according to the first embodiment. The logic process part 130 includes a flow execution part 131, a component management part 132, a component group 133, a flow progress management part 134, a flow change part 135, a flow progress information storage part 136, and a change rule information storage part 137.

After the flow execution part 131 receives a request to carry out a process of a scan delivery service from the browser 210, it acquires process contents from the application information 1000 via the application management part 120. Then, the flow execution part 131 requests components to carry out the processes according to the operations defined in the process contents acquired from the application information 1000. "Components" mean modules, or the like, for carrying out various processes. For example, components are defined by classes, functions, and/or the like.

After the flow execution part 131 receives the process results from the components, it requests the flow progress management part 134 to update flow progress information. The "flow progress information" is information concerning operations that have been already carried out, from among those defined in the process contents.

Before the flow execution part 131 requests the components to carry out the processes according to the operations defined in the process contents, or after the flow execution part 131 receives the process results from the components that have carried out the processes, it requests the flow change part 135 to determine whether to change the process contents. Thus, according to the service provision system 10 in the first embodiment, it is determined whether to change process contents before and after carrying out processes according to the operations defined in the process contents. Then, as will be described later, according to the determination result, the flow change part 135 may change the process contents. Thus, process contents that indicate a sequence of processes are dynamically changed.

The component management part 132 generates a component in response to a request from the flow execution part 131. To "generate a component" means, for example, to expand a component defined by a class in a memory (for example, the RAM 14).

The component group 133 is a collection of components. The component group 133 includes a delivery component 1331 for delivering an electronic file to the external storage system 30, and an OCR component 1332 for carrying out an OCR process on an electronic file. The component group 133 further includes a confidential conversion component 1333 for converting an electronic file to an electronic file with a password. Other than these, the component group 133 can include, for example, an acquirement component for acquiring an electronic file from the external storage system 30, an authentication component for acquiring authentication information to be used to use the external storage system 30, and so forth.

Thus, in the component group 133, components that carry out processes of operations defined in process contents are defined. Thus, the flow execution part 131 carries out a sequence of processes to implement a service that is provided by the service provision system 10, by requesting components that correspond to operations to carry out the processes, according to the operations defined in process contents.

Each component has a component common I/F 1330. The component common I/F 1330 includes APIs defined for each component in common, i.e., an API for generating the component and an API for requesting the component to carry out a process. As a result of each component having the component common I/F 1330, it is possible to localize an influence of an addition of a component, or the like. As a result, it is possible to reduce man-hours required for a development such as an addition of a component.

When the flow progress management part 134 receives the flow progress information from the flow execution part 131, it stores the received flow progress information in the flow progress information storage part 136.

In response to a request from the flow execution part 131, the flow change part 135 determines whether to change process contents, based on the change rule information table 1371 stored in the change rule information storage part 137. The flow change part 135 may change the process contents according to the determination result. To "change process contents" means to generate process contents where a definition of an operation is newly added, or a defined operation is deleted or changed.

The flow progress information storage part 136 stores a flow progress information table 1361. The flow progress information table 1361 includes states where the operations defined in the process contents are carried out. Thus, the flow progress management part 134 manages as to which operations have been carried out from among those defined in the process contents that indicate the sequence of processes. Details of the flow progress information table 1361 will be described later.

The change rule information storage part 137 stores a change rule information table 1371. The change rule information table 1371 is information that is read by the flow change part 135 for changing the process contents. The change rule information table 1371 includes conditions for changing process contents and the contents of changes (change contents) carried out when the conditions are satisfied. Details of the change rule information table 1371 will be described later.

Thus, the service provision system 10 according to the first embodiment determines whether to change process contents based on the change rule information table 1371 before and after carrying out of processes according to operations defined in the process contents that indicate a sequence of the processes. The service provision system 10 may change the process contents according to the determination result. Thus, process contents that are carried out by the service provision system 10 are dynamically changed.

<Process Detail>

Then, details of processes of the information processing system 1 according to the first embodiment will be described.

<<Process of Overall Scan Delivery Service>>

Figure 8:
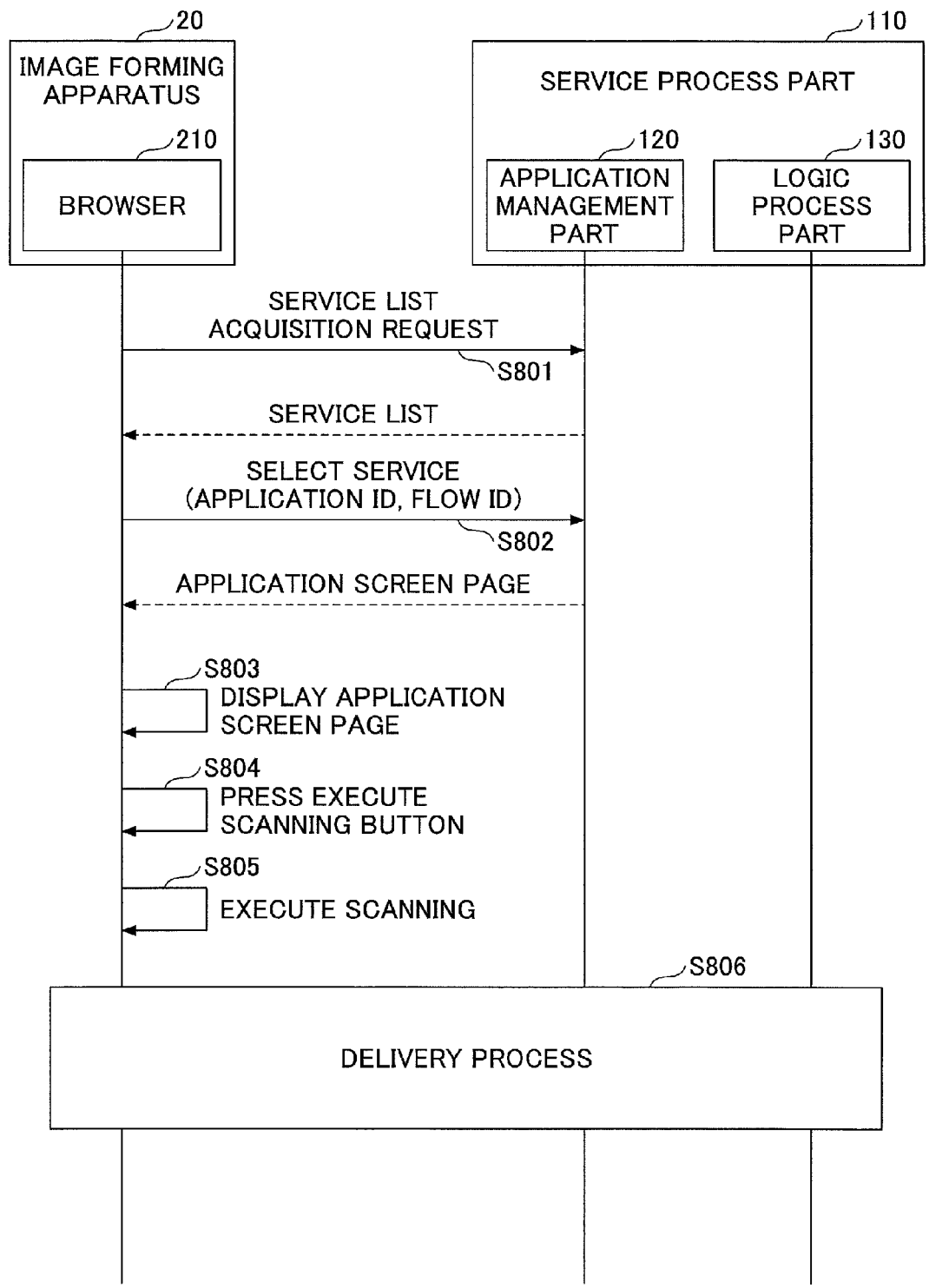
FIG. 8 is a sequence diagram illustrating one example of an overall process of a scan delivery service according to the first embodiment.

First, an overall process carried out when a user of the image forming apparatus 20 uses a scan delivery service according to the first embodiment will be described with reference to FIG. 8. FIG. 8 is a sequence diagram illustrating one example of an overall process of a scan delivery service according to the first embodiment.

First, the user of the image forming apparatus 20 uses the browser 210 to perform an operation to acquire a list of services provided by the service provision system 10. As a result, the image forming apparatus 20 transmits a corresponding service list acquisition request to the service process part 110 of the service provision system 10 (step S801). The application management part 120 of the service process part 110 receives the service list acquisition request, and, in response thereto, transmits a list of services that can be provided by the service provision system 10 to the image forming apparatus 20. As a result, the browser 210 of the image forming apparatus 20 displays the list of services that can be provided by the service provision system 10 on the operation panel 22 of the image forming apparatus 20. The list of services includes, for each of the services that can be provided by the service provision system 10, the service name, the application ID of the corresponding set of application information 1000 that implements the service, and the flow ID of process contents included in the set of application information 1000.

The user selects a service that the user wishes to use from the service list displayed on the operation panel 22 of the image forming apparatus 20. As a result, the browser 210 transmits the application ID of the set of application information 1000 that implements the thus selected service to the application management part 120 (step S802). Hereinafter, it is assumed that the user has thus selected the service to use a "scan delivery service" to scan an original copy and deliver the thus acquired image data to the storage service A. Therefore, the browser 210 transmits the application ID "app001" of the corresponding application information 1000$_1$ to the application management part 120. Then, the application management part 120 generates an application screen page in a HyperText Markup Language (HTML) format based on a screen page definition included in the application information 1000$_1$ having the application ID "app001" received from the browser 210, and transmits it to the browser 210.

The browser 210 receives the application screen page from the application management part 120, and thus, displays the application screen page 1500 such as that shown in FIG. 9, for example, on the operation panel 22 (step S803). FIG. 9 illustrates one example of the application screen page 1500 for the user to use the scan delivery service to scan an original copy and deliver the thus acquired image data to the storage service A.

Then, the user inputs a desired file name for an electronic file to be generated through scanning to a file name input field 1502 in the application screen page 1500 shown in FIG. 9. Also, the user inputs a folder name of a folder of the storage service A in which the electronic file generated through scanning is to be stored to a storage destination folder ID input field 1503. Hereinafter, it is assumed that a file name "test" is input to the file name input field 1502, and a folder ID "/folder1" of a storage destination folder is input to the storage destination folder ID input field 1503. In the application screen page 1500 shown in FIG. 9, "ENGLISH" is selected at an OCR language selection field 1501 to indicate that an OCR processes carried out in English. However, the user can select any other language.

In the above-mentioned case, in the application screen page 1500 shown in FIG. 9, the user directly inputs the folder ID of the storage destination folder in the storage service A. Alternatively, the user can select the storage destination folder from a folder list. That is, for example, the data I/F 140 can acquire a folder list of the storage service A through the data process part 180, and the user can select the storage destination folder from the acquired folder list.

Then, the user sets an original copy on the scanner 25 of the image forming apparatus 20, and presses a "execute scanning" button 1504 (step S804). As a result, the scanner 25 of the image forming apparatus 20 reads the original copy, and generates the electronic file having the file name that has been input to the file name input field 1502 (step S805). Then, the image forming apparatus 20 carries out a delivery process to deliver the generated electronic file to the storage service A (step S806). The delivery process will now be described in detail with reference to FIG. 10.

A description will now be made for a case where, in the delivery process shown in FIG. 10, after an OCR process is carried out on the electronic file generated through the scanning, a process to convert the OCR processed electronic file to an electronic file with a password is dynamically added. Therefore, in the delivery process shown in FIG. 10, as a result of the process being thus dynamically added (i.e., as a result of the process contents being thus changed), an electronic file with a password, acquired from the conversion that is carried out according to the added process, is delivered (uploaded) to the storage service A.

<<Delivery Process>>

FIG. 10 is a sequence diagram illustrating one example of a delivery process according to the first embodiment.

First, the browser 210 transmits a scan delivery service process execution request to the flow execution part 131 (step S1001). The scan delivery service process execution request includes the application ID "app001", the flow ID "flow1" of the process contents to be carried out, the electronic file generated through the scanning, the folder ID of the storage destination folder, and so forth. When the flow execution part 131 receives the scan delivery service process execution request, it acquires the process contents of the flow ID "flow1" from the application information 1000$_1$ of the application ID "app001" included in the scan delivery service process execution request, through the application management part 120 (step S1002). Thus, the flow execution part 131 acquires the process contents 1100 shown in FIG. 6.

The flow execution part 131 then generates a job ID to be used to uniquely identify a job to be carried out based on the process contents (step S1003). Hereinafter, it is assumed that the job ID "Job001" is generated at this time.

Then, the flow execution part 131 sends a determination request to the flow change part 135 to request it to determine whether to change the process contents (step S1004). This determination request includes the process contents 1100 acquired in step S1002, data that indicates the electronic file generated through the scanning, and so forth. For electronic files, various data types are defined, for example, "InputStream" that indicates an input stream, "LocalFilePath" that indicates a storage destination path for the electronic file, and so forth. Electronic files which are treated without regard to such data types will be simply referred to as "data".

The flow change part 135 reads the change rule information table 1371, and determines whether to change the process contents (step S1005).

Actually, the flow change part 135 reads the change rule information table 1371, for example, as shown in FIG. 11, and determines whether to change the process contents. In more detail, the flow change part 135 reads change conditions in the change rule information table 1371 shown in FIG. 11, and determines whether the any one of the change conditions included in the change rule information table 1371 is satisfied. In other words, the flow change part 135 determines whether to newly add a definition of an operation in the process contents to generate process contents, or delete or change a defined operation in the process contents to generate process contents.

If any one of the change conditions included in the change rule information table 1371 is satisfied, the flow change part 135 determines to change the process contents. If none of the change conditions included in the change rule information table 1371 is satisfied, the flow change part 135 determines to not change the process contents. It is assumed that the flow change part 135 has acquired the determination result indicating to not change at this time. The flow change part 135 transmits the determination result to the flow execution part 131.

Then, the flow execution part 131 requests the component management part 132 to acquire the component according to the operation defined in the process contents (step S1006). In more detail, the flow execution part 131 requests the component management part 132 to acquire the OCR component 1332 based on the operation 1101 of the process contents 1100 shown in FIG. 6.

After the component management part 132 receives the request to acquire the OCR component 1332, it generates the OCR component 1332 (step S1007). The OCR component 1332 can be generated using an API that is for generating a component defined in the component common I/F 1330. When the OCR component 1332 is thus generated, the component management part 132 returns the thus generated OCR component 1332 to the flow execution part 131. This can be achieved in such a manner that, for example, the component management part 132 returns the corresponding address in a memory (for example, the RAM 14), where the OCR component 1332 is expanded, to the flow execution part 131.

The flow execution part 131 designates the data for the thus generated OCR component 1332 and request it to carry out the process (step S1008).

After the OCR component 1332 receives the process execution request where the data is designated from the flow execution part 131, it carries out the process on the designated data (step S1009). In more detail, the OCR component 1332 requests the OCR process part 151 of the document service part 150 to carry out the process, and the OCR process part 151 carries out an OCR process on the designated data (i.e., the electronic file). Then, the OCR component 1332 returns the process result to the flow execution part 131. The thus returned process result is data acquired from the OCR process being thus carried out on the electronic file that is generated through the scanning (in more detail, the electronic file in a PDF format).

Then, the flow execution part 131 transmits flow progress information to the flow progress management part 134 and requests it to update the flow progress information table 1361 (step S1010). The flow progress information includes the job ID "Job001" generated in step S1003, the flow ID "flow1" of the process contents 1100, and the operation name "ocr" of the thus carried out operation 1101 corresponding to the OCR component 1332.

Then, the flow progress management part 134 updates the flow progress information table 1361 of the flow progress information storage part 136 based on the job ID, the flow ID of the process contents, and the operation name included in the flow progress information (step S1011). In more detail, as shown in FIG. 12A, the flow progress management part 134 adds a record that includes job ID "Job001", application ID "app001", flow ID "flow1", and operation "ocr" to the flow progress information table 1361. Thus, the flow progress information table 1361 indicates that, concerning the job of job ID "Job001", the operation 1101 included in the process contents 1100 identified by the flow ID "flow1" of the application ID "app001" has been carried out. Then, the flow progress management part 134 transmits the update result that indicates that the update has been completed to the flow execution part 131.

Then, the flow execution part 131 sends a determination request that requests the flow change part 135 to determine whether to change the process contents (step S1012). The determination request includes the process contents 1100 acquired in step S1002, and the data acquired from the OCR process being carried out in step S1009, and so forth.

Then, the flow change part 135 reads the change rule information table 1371, and determines whether to change the process contents (step S1013).

Actually, the flow change part 135 reads the change rule information table 1371, for example, shown in FIG. 11, and determines whether to change the process contents. In more detail, the flow change part 135 reads the change conditions of the change rule information table 1371 shown in FIG. 11, and determines whether any one of the change conditions included in the change rule information table 1371 is satisfied. In other words, the flow change part 135 determines whether to newly add a definition of an operation in the process contents to generate process contents, or delete or change a defined operation in the process contents to generate process contents.

If any one of the change conditions included in the change rule information table 1371 is satisfied, the flow change part 135 determines to change the process contents. If none of the change conditions included in the change rule information table 1371 is satisfied, the flow change part 135 determines to not change the process contents. It is assumed that, because the data (the above-mentioned electronic file in a PDF format acquired through the OCR process) includes the text "password", the flow change part 135 determines that the change condition of the change rule ID "1" included in the change rule information table 1371 is satisfied.

As a result, the flow change part 135 changes the process contents acquired in step S1002 based on the change contents of the change rule ID, which are determined in step S1013 as corresponding to the satisfied change condition (step S1014). In more detail, the flow change part 135 changes the process contents 1100 to the changed process contents 2000 shown in FIG. 13 based on the change contents of the change rule ID "1", which are determined in step S1013 as corresponding to the satisfied change condition. That is, the flow change part 135 inserts, subsequent to the already carried out operation 1101 in the process contents 1100, an operation 2100 of converting an electronic file in a PDF format to an electronic file with a password in a PDF format is, based on the change contents of the change rule ID "1". Thus, in the service provision system 10 according to the first embodiment, process contents to be carried out by the flow execution part 131 are dynamically changed. Then, the flow change part 135 transmits the changed process contents 2000 to the flow execution part 131.

Then, the flow execution part 131 requests the component management part 132 to acquire the component according to the operation defined in the process contents (i.e., the changed process contents 2000) that have been changed in step S1014 (step S1015). In more detail, the flow execution part 131 sends an acquisition request that requests the component management part 132 to acquire the confidential conversion component 1333, based on the operation 2100 defined subsequent to the operation 1101 of the changed process contents 2000 shown in FIG. 13.

After the component management part 132 receives the acquisition request for the confidential conversion component 1333, it generates the confidential conversion component 1333 (step S1016). The confidential conversion component 1333 can be generated using an API that is for generating a component defined in the component common I/F 1330. Then, after the confidential conversion component 1333 is generated, the component management part 132 returns the confidential conversion component 1333 to the flow execution part 131. Actually, the component management part 132 can return the corresponding address in a memory (for example, the RAM 14) where the confidential conversion component 1333 is expanded, to the flow execution part 131, for example.

The flow execution part 131 designates the data for the generated confidential conversion component 1333, and sends a process execution request that requests the confidential conversion component 1333 to carry out the process (step S1017). The thus designated data is actually the data that is returned from the OCR component 1332 as the process result in step S1009.

After the confidential conversion component 1333 receives, from the flow execution part 131, the process execution request, for which the data is thus designated, it carries out the process on the designated data (step S1018). In more detail, the confidential conversion component 1333 requests the confidential conversion process part 152 of the document service part 150 to carry out the process, and the confidential conversion process part 152 carries out a process to add a password to the designated data. That is, the confidential conversion process part 152 converts the designated electronic file to an electronic file with a password. Then, the confidential conversion component 1333 returns the process result to the flow execution part 131. The thus returned process result is the data, to which the password is thus added (in more detail, the electronic file in a PDF format with a password).

Then, the flow execution part 131 transmits flow progress information to the flow progress management part 134 and requests it to update the flow progress information table 1361 (step S1019). The flow progress information includes the job ID "Job001", the flow ID "flow1" of the changed process contents 2000, the operation name "pdf2securepdf" of the thus carried out operation 2100 corresponding to the confidential conversion component 1333, and so forth.

Then, the flow progress management part 134 updates the flow progress information table 1361 of the flow progress information storage part 136, based on the job ID, the flow ID of the process contents (the changed process contents), and the operation name included in the flow progress information (step S1020). In more detail, as shown in FIG. 12B, the flow progress management part 134 inserts the operation name "pdf2securepdf" in the record identified by the job ID "Job001", the application ID "app001", and the flow ID "flow1", in the flow progress information table 1361. As a result, the flow progress information table 1361 indicates that, concerning the job of job ID "Job001", the operations 1101 and 2100 included in the changed process contents 2000 identified by the flow ID "flow1" of the application ID "app001" have been carried out. Then, the flow progress management part 134 transmits the update result indicating that the update has been completed to the flow execution part 131.

Then, the flow execution part 131 sends a determination request that requests the flow change part 135 to determine whether to change the process contents (the changed process contents) (step S1021). The determination request includes the changed process contents 2000, the data, to which the password is added in step S1018, and so forth.

Then, the flow change part 135 reads the change rule information table 1371, and determines whether to change the process contents (the changed process contents) (step S1022). It is assumed that, in the same way as step S1005, the flow change part 135 acquires the determination result indicating to not change the process contents. The flow change part 135 transmits the determination result to the flow execution part 131.

Then, the flow execution part 131 requests the component management part 132 to acquire the component according to the operation defined in the changed process contents 2000 (step S1023). In more detail, the flow execution part 131 requests the component management part 132 to acquire the delivery component 1331 based on the operation 1102 defined subsequent to the operation 2100 in the changed process contents 2000 shown in FIG. 13.

After the component management part 132 receives the request to acquire the delivery component 1331, it generates the delivery component 1331 (step S1024). The delivery component 1331 can be generated using an API that is for generating a component defined in the component common I/F 1330. Then, after thus generating the delivery component 1331, the component management part 132 returns the delivery component 1331 to the flow execution part 131. Actually, the component management part 132 can return the corresponding address in a memory (for example, the RAM 14) where the delivery component 1331 is expanded to the flow execution part 131.

The flow execution part 131 designates the data for the generated the delivery component 1331, and sends a process execution request that requests the delivery component 1331 to carry out the process (step S1025). The thus designated data is, actually, the data returned from the confidential conversion component 1333 as the process result in step S1018.

After the delivery component 1331 receives, from the flow execution part 131, the process execution request, for which the data is designated, it carries out the process on the designated data (step S1026). In more detail, the delivery component 1331 requests the file process part $170_1$ of the storage service A cooperation part $160_1$ to deliver the data using the API defined as the common I/F $171_1$ that is for storing a file. That is, the delivery component 1331 designates, for example, "service-a/process/folder?path=/floder1&name=test" using the API "EXTERNAL SERVICE NAME/process/folder" shown in FIG. 5A, for the file process part $170_1$ of the storage service A cooperation part $160_1$. As a result, the data (actually, the electronic file in a PDF format with a password) of the file name "test" is delivered to the folder of the folder path "/folder1" in the storage service A. Then, the delivery component 1331 transmits the result of the data delivery process to the flow execution part 131.

Then, the flow execution part 131 transmits flow progress information to the flow progress management part 134 and requests it to update the flow progress information table 1361 (step S1027). The flow progress information includes the job ID "Job001", the flow ID "flow1" of the changed process contents 2000, and the operation name "uploadFile" of the thus carried out operation 1101 corresponding to the delivery component 1331.

Then, the flow progress management part 134 updates the flow progress information table 1361 of the flow progress information storage part 136 based on the job ID, the flow ID of the process contents (the changed process contents), and the operation name included in the flow progress information (step S1028). In more detail, as shown in FIG. 12C, in the flow progress information table 1361, the operation "uploadFile" is inserted to the record identified by the job ID "Job001", the application ID "app001" and the flow ID "flow1". As a result, the flow progress information table 1361 indicates that, concerning the job of the job ID "Job001", the operations 1101, 2100, and 1102 included in the changed process contents 2000 identified by the flow ID "flow1" of the application ID "app001" have been carried out. Then, the flow progress management part 134 transmits the update result that indicates that the update has been completed to the flow execution part 131.

Then, the flow execution part 131 sends a determination request that requests the flow change part 135 to determine whether to change the process contents (the changed process contents) (step S1029). The determination request includes the changed process contents 2000, the data delivered (uploaded) to the storage service A in step S1026, and so forth.

Then, the flow change part 135 reads the change rule information table 1371, and determines whether to change the process contents (the changed process contents) (step S1030). It is assumed that, in the same way as steps S1005 and S1022, the flow change part 135 acquires the determination result that indicating to not change the process contents. The flow change part 135 then transmits the determination result to the flow execution part 131. Finally, the flow execution part 131 transmits the process result indicating that the data delivery process has been completed to the browser 210. Thus, the delivery process according to the first embodiment is completed.

Concerning the delivery process according to the first embodiment, a case has been described above where, in step S1014, as the change contents for the process contents, the new operation is added subsequent to the already carried out operation. However, actual cases are not limited thereto. As the change contents for the process contents, the operation defined subsequent to the already carried out operation can be deleted or changed. Also, the actual number of operations to be added, deleted or changed as the change contents is not limited to one. A plurality of operations can be added, deleted or changed as the change contents. In other words, the change contents applied when the change condition in the change rule information table 1371 is satisfied can be, for example, freely determined by an administrator of the information processing system 1, or the like.

Thus, in the service provision system 10 according to the first embodiment, when process contents that indicate a sequence of processes are carried out, the process contents can be dynamically changed. Therefore, in the service provision system 10 according to the first embodiment, it is possible to prevent the process contents to be managed by the application information storage part 190 from increasing. For example, the basic process contents to be highly frequently used can be managed by the application information storage part 190. In contrast thereto, such a configuration can be provided that unique processes that are carried out depending on characteristics of data, or the like, are dynamically added, for example. Thus, it is possible to reduce the number of items of process contents to be managed by the application information storage part 190. Thus, it is possible to reduce the management load concerning the process contents of the administrator of the service provision system 10. Also, it is possible to reduce the operation load of the user required when the user selects a service to be implemented by the process contents, for example.

[Second Embodiment]

An information processing system 1 according to a second embodiment will now be described. The service provision system 10 included in the information processing system 1 according to the second embodiment urges the user to determine whether to continue a process according to changed process contents if process contents are changed by the flow change part 135. As a result, the user is allowed to determine whether to continue the process after the user knows the dynamically changed process contents. Below, the same reference numerals are given to the elements having substantially the same functions as those of the first embodiment and the elements that carry out the same processes as those of the first embodiment, and the description thereof will be omitted.

<Process Detail>

Processes carry out by the information processing system 1 according to the second embodiment will now be described in detail.

<<Delivery Process>>

Figure 14:
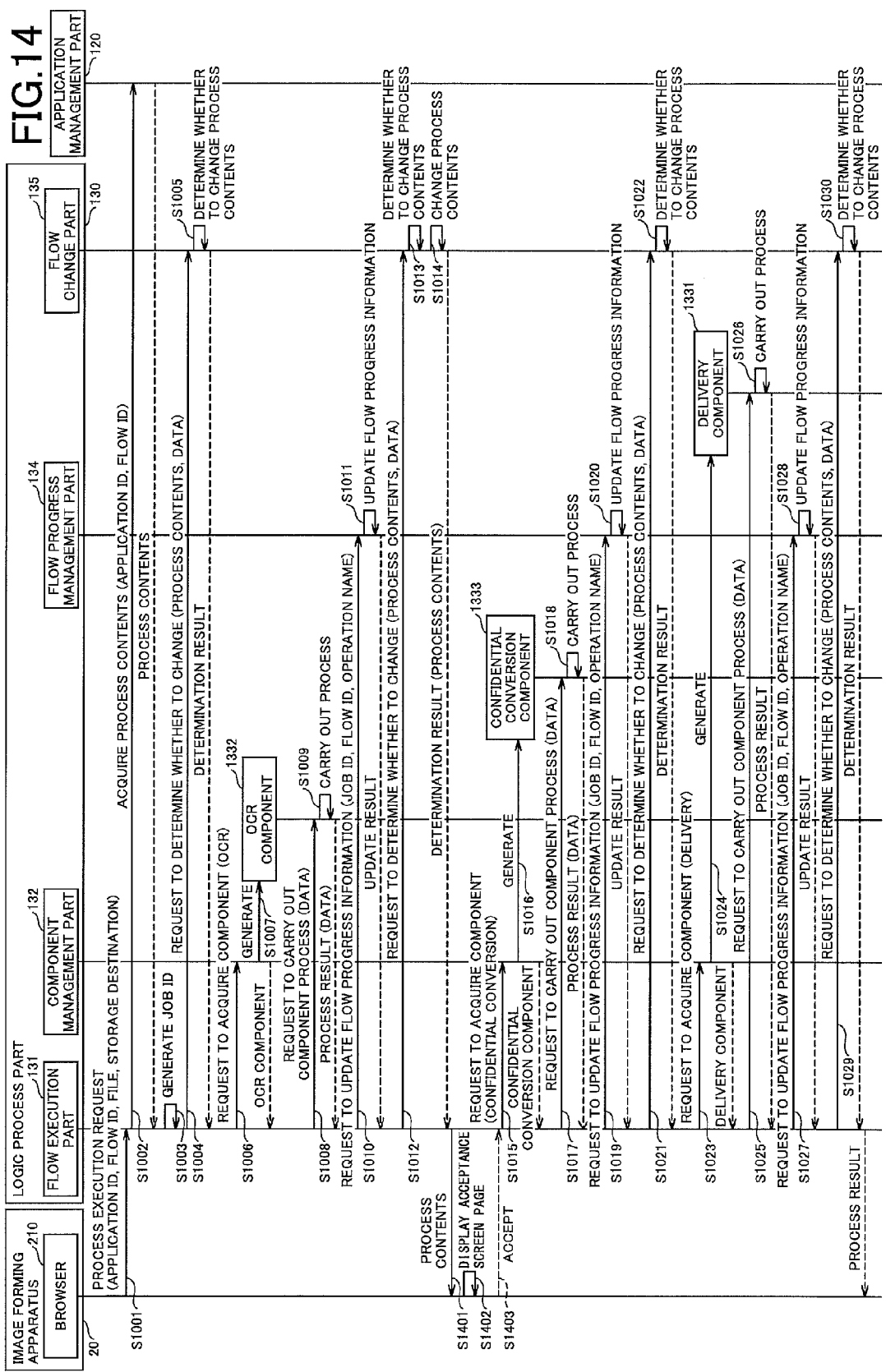
FIG. 14 is a sequence diagram illustrating one example of a delivery process according to the second embodiment.

The delivery process according to the second embodiment will now be described with reference to FIG. 14. FIG. 14 is a sequence diagram illustrating one example of the delivery process according to the second embodiment.

The flow execution part 131 receives, from the flow change part 135, the changed process contents 2000, and, as a result, transmits the changed process contents 2000 to the browser 210 (step S1401). At this time, the flow execution part 131 acquires a screen page definition from the application management part 120 for displaying an acceptance screen page 3000, for example, as shown in FIG. 15, through the browser 210, and transmits the application screen page to the browser 210 generated based on the acquired screen page definition.

Figure 15:
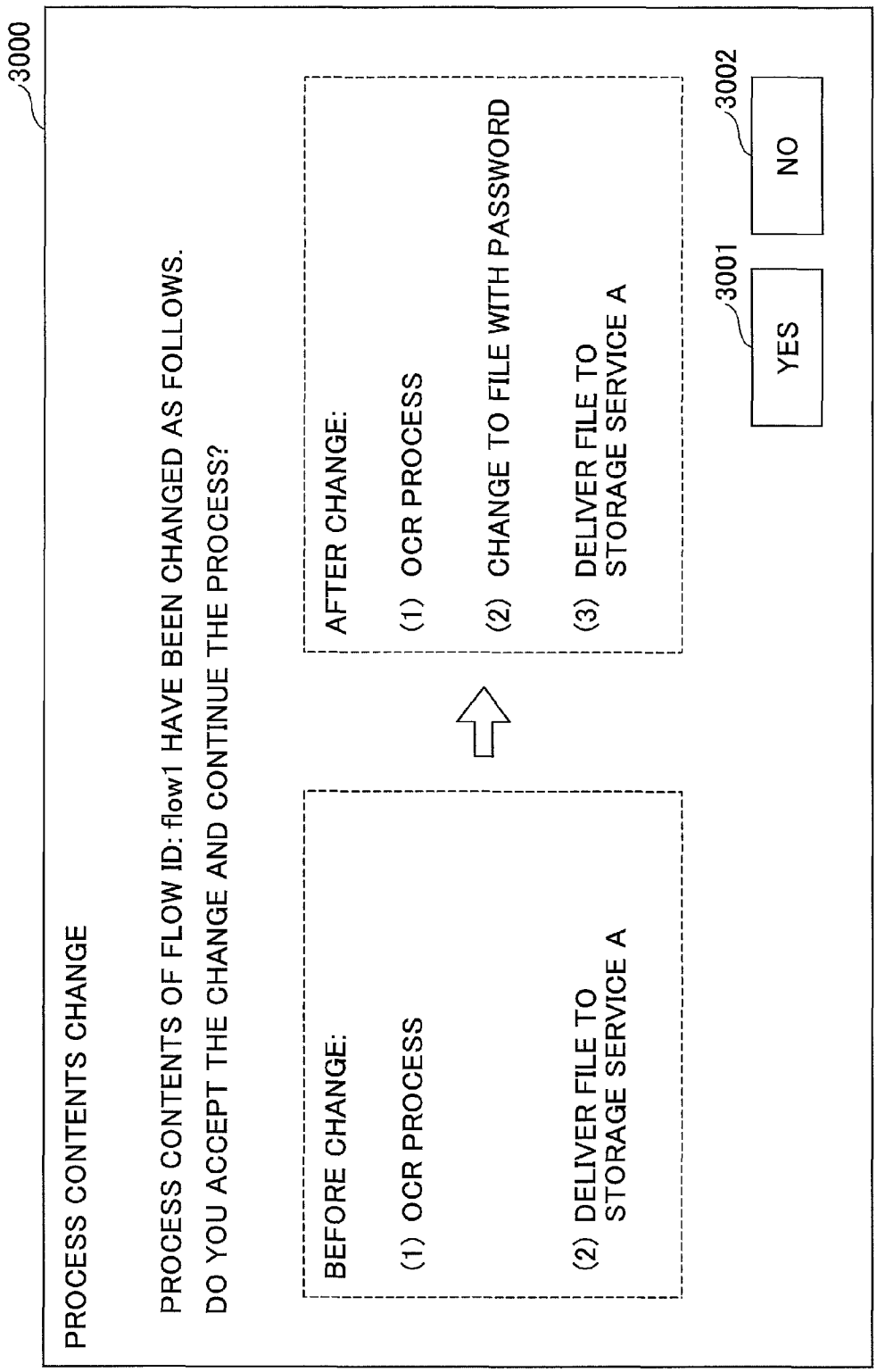
FIG. 15 illustrates one example of a screen page for accepting changed process contents.

After the browser 210 receives the changed process contents 2000 and the application screen page from the flow execution part 131, it displays the acceptance screen page 3000, as shown in FIG. 15, based on the received changed process contents 2000 and application screen page (step S1402). By seeing the acceptance screen page 3000 shown in FIG. 15, the user can know that the process contents have been changed. If the user then presses the "YES" button 3001 in the acceptance screen page 3000, the browser 210 transmits information that indicates that the user accepts the change in the process contents to the flow execution part 131 (step S1403). As a result, the flow execution part 131 carries out the process according to the changed process contents 2000.

In contrast thereto, if the user presses the "NO" button 3002 in the acceptance screen page 3000, the browser 210 transmits information that indicates that the user denies the change in the process contents to the flow execution part 131. At this time, the flow execution part 131 stops carrying out of the process according to the changed process contents 2000 (i.e., it stops the job ID "Job001"). Alternatively, the flow execution part 131 can carry out the process according to the process contents 1100 before the change, instead of thus stopping the process according to the changed process contents 2000.

<Summary of Embodiments>

Thus, the service provision system 10 according to the first embodiment reads the change rule information table 1371 and determines whether to change the process contents, before requesting each component to carry out a process or after receiving a process result from a component that has carried out a process. Then, if the change condition in the change rule information table 1371 is satisfied, the service provision system 10 changes the process contents to the change contents corresponding to the thus satisfied change condition. Thus, the service provision system 10 according to the first embodiment, it is possible to dynamically change process contents. Therefore, in the service provision system 10 according to the first embodiment, it is possible to prevent process contents to be managed by the application information storage part 190 from increasing.

According to the service provision system 10 in the second embodiment, the user is allowed to check change contents if process contents are changed. Thus, the user is allowed to determine whether to continue the process according to the thus changed process contents after the user knows the process contents that have been dynamically changed. Therefore, even if the process contents that have been dynamically changed by the service provision system 10 do not meet the user intention, for example, it is possible to prevent the process that does not meet the user's intention from being actually carried out.

The application information storage part 190 is one example of a part that stores application identification information and first-sequence information. The flow execution part 131 is one example of a part that receives a request that includes the application identification information and electronic-data information and a part that carries out a first sequence of processes on electronic data. The flow change part 135 is one example of a part that determines whether to generate second-sequence information. The change rule information storage part 137 is one example of a part that stores condition information and previously-carried-out-process information.

According to the embodiments described above, it is possible to dynamically add a process to a sequence of processes.

Thus, the information processing systems, the information processing apparatuses and the information processing methods have been described in the embodiments. However, application of the present disclosure is not limited to the embodiments, and various modifications and replacements can be made.

What is claimed is:

1. An information processing system, which includes at least one information processing apparatus, the information processing system including at least one processor, the at least one processor being configured to:
    store, for each application that carries out a first sequence of processes using electronic data, application identification information to identify the application and first-sequence information concerning the first sequence of processes, in a manner of associating them with one another;
    receive, from one apparatus connected with the information processing system, a request that includes the application identification information and electronic-data information concerning the electronic data designated by a user of the one apparatus;
    carry out the first sequence of processes based on the first-sequence information stored in association with the application identification information included in the request on the electronic data designated by the electronic-data information included in the request;
    determine, before carrying out each process of the first sequence of processes, whether to generate second-sequence information that is different from the first-sequence information in that previously-carried-out-process information concerning an additional process to be carried out before the process of the first sequence of processes is added, and if the at least one processor determines to generate the second-sequence information, generate the second-sequence information; and
    if the at least one processor generates the second-sequence information, carry out a second sequence of processes that is different from the first sequence of processes in that the additional process is carried out before the process of the first sequence of processes, on the electronic data, wherein the at least one processor is further configured to
store condition information concerning a condition for generating the second-sequence information, and the previously-carried-out-process information concerning the additional process to be carried out before the process of the first sequence of processes if the condition is satisfied, in a manner of associating them with one another; and
before carrying out the process of the first sequence of processes, read the stored condition information, determine whether to generate the second-sequence information by determining whether the read condition is satisfied, and if the at least one processor determines that the read condition is satisfied, generates the second-sequence information that is different from the first-sequence information in that the previously-carried-out-process information is added before process information concerning the process of the first sequence of processes.

2. The information processing system as claimed in claim 1, wherein
the at least one processor is further configured to
determine, after carrying out the first sequence of processes or the second sequence of processes, whether to generate third-sequence information that is different from the first-sequence information or the second-sequence information in that subsequently-carried-out-process information concerning an additional process to be carried out after the first sequence of processes or the second sequence of processes is added, and if the at least one processor determines to generate the third-sequence information, generate the third-sequence information.

3. The information processing system as claimed in claim 2, wherein
the at least one processor is further configured to
store condition information concerning a condition for generating the second-sequence information, and the previously-carried-out-process information concerning the additional process to be carried out before the process of the first sequence of processes if the condition is satisfied, in a manner of associating them with one another; and
before carrying out the process of the first sequence of processes, read the stored condition information, determine whether to generate the second-sequence information by determining whether the read condition is satisfied, and if the at least one processor determines that the read condition is satisfied, generates the second-sequence information that is different from the first-sequence information in that the previously-carried-out-process information is added before process information concerning the process of the first sequence of processes.

4. The information processing system as claimed in claim 1, wherein
the condition of the stored condition information is a condition that the electronic data includes a predetermined character string, and the stored corresponding previously-carried-out-process information includes data-conversion-process information concerning a process of converting the electronic data in a predetermined data format as the additional process to be carried out before the process of the first sequence of processes if the condition is satisfied, and if the at least one processor determines that the read condition is satisfied, generates the second-sequence information that is different from the first-sequence information in that the data-conversion-process information is added before the process information.

5. The information processing system as claimed in claim 3, wherein
the condition of the stored condition information is a condition that the electronic data includes a predetermined character string, and the stored corresponding previously-carried-out-process information includes data-conversion-process information concerning a process of converting the electronic data in a predetermined data format as the additional process to be carried out before the process of the first sequence of processes if the condition is satisfied, and if the at least one processor determines that the read condition is satisfied, generates the second-sequence information that is different from the first-sequence information in that the data-conversion-process information is added before the process information.

6. The information processing system as claimed in claim 1, wherein
the at least one processor is further configured to
determine, before carrying out the process of the first sequence of processes, whether to generate the second-sequence information that is different from the first-sequence information in that the previously-carried-out-process information concerning the additional process to be carried out before the process of the first sequence of processes is added, or information concerning the process of the first sequence of processes is deleted or changed, and generates the second-sequence information if the at least one processor determines to generate the second-sequence information.

7. An information processing method for an information processing system that includes at least one memory, the information processing method comprising:
storing in the memory, for each application that carries out a first sequence of processes using electronic data, application identification information to identify the application and first-sequence information concerning the first sequence of processes, in a manner of associating them with one another;
receiving, from one apparatus connected with the information processing system, a request that includes the application identification information and electronic-data information concerning the electronic data designated by a user of the one apparatus;
carrying out the first sequence of processes based on the first-sequence information stored in association with the application identification information included in the request on the electronic data designated by the electronic-data information included in the request;
determining, before carrying out each process of the first sequence of processes, whether to generate second-sequence information that is different from the first-sequence information in that previously-carried-out-process information concerning an additional process to be carried out before the process of the first sequence of processes is added, and if it is determined to generate the second-sequence information, generating the second-sequence information;
if the second-sequence information is generated, carrying out a second sequence of processes that is different from the first sequence of processes in that the additional process is carried out before the process of the first sequence of processes, on the electronic data;
storing condition information concerning a condition for generating the second-sequence information, and the previously-carried-out-process information concerning the additional process to be carried out before the process of the first sequence of processes if the condition is satisfied, in a manner of associating them with one another; and
before carrying out the process of the first sequence of processes, reading the stored condition information, determine whether to generate the second-sequence information by determining whether the read condition is satisfied, and if the at least one processor determines that the read condition is satisfied, generating the second-sequence information that is different from the first-sequence information in that the previously-carried-out-process information is added before process information concerning the process of the first sequence of processes.

* * * * *